(12) United States Patent
Park et al.

(10) Patent No.: US 10,285,246 B2
(45) Date of Patent: May 7, 2019

(54) COMMUNICATION DEVICE USING POWERLINE AND LED LIGHTING SYSTEM USING THE DEVICE

(71) Applicant: SOFTKERNEL CO., LTD., Gyeonggi-do (KR)

(72) Inventors: Kwang Youn Park, Seoul (KR); Sangheon Lee, Gyeonggi-do (KR); Jae Heung Park, Incheon (KR); Jung Ryul Kim, Seoul (KR)

(73) Assignee: SOFTKERNEL CO., LTD., Gyeonggi-Do (KR)

( * ) Notice: Subject to any disclaimer, the term of this patent is extended or adjusted under 35 U.S.C. 154(b) by 118 days.

(21) Appl. No.: 15/119,643

(22) PCT Filed: Feb. 18, 2015

(86) PCT No.: PCT/KR2015/001671
§ 371 (c)(1),
(2) Date: Aug. 17, 2016

(87) PCT Pub. No.: WO2015/122753
PCT Pub. Date: Aug. 20, 2015

(65) Prior Publication Data
US 2017/0064794 A1   Mar. 2, 2017

(30) Foreign Application Priority Data

Feb. 17, 2014   (KR) .................. 10-2014-0018146
Feb. 17, 2014   (KR) .................. 10-2014-0018148
Feb. 17, 2015   (KR) .................. 10-2015-0024486

(51) Int. Cl.
*H05B 37/02*   (2006.01)
*H04B 3/46*    (2015.01)
(Continued)

(52) U.S. Cl.
CPC .......... *H05B 37/0263* (2013.01); *H04B 3/46* (2013.01); *H04B 3/54* (2013.01); *H04B 3/548* (2013.01);
(Continued)

(58) Field of Classification Search
None
See application file for complete search history.

(56) References Cited

U.S. PATENT DOCUMENTS 6,734,784 B1    5/2004   Lester
2011/0248835 A1*  10/2011  Speegle ................. G08C 19/02
                                                         340/12.32

FOREIGN PATENT DOCUMENTS

JP   2013089564    6/2013
KR   20000002198   1/2000
(Continued)

*Primary Examiner* — Jimmy T Vu
*Assistant Examiner* — Laura Yesildag
(74) *Attorney, Agent, or Firm* — IPLA P.A.; James E. Bame

(57) ABSTRACT

Provided is a communication device using a powerline which can transmit and receive control data and so on by using the powerline, and an LED (Light Emitting Diode) lighting system using the device which can control the illumination of an LED by using the communication device. The LED illumination device comprising: one or more control devices coupled with commercial power source through powerlines; one or more LED illumination devices coupled with control devices, respectively, through the powerlines; and a management device for performing communication with the control devices; wherein the control devices and the LED illumination device perform data transmission and reception by using the powerlines, the data communication from the control devices to the LED illumination device is executed by broadcasting method, and
(Continued)

the data communication from the LED illumination device to the control devices is executed by polling method.

8 Claims, 9 Drawing Sheets

(51) Int. Cl.
    *H04B 3/54*     (2006.01)
    *H05B 33/08*     (2006.01)

(52) U.S. Cl.
    CPC ..... *H05B 33/0815* (2013.01); *H05B 33/0845* (2013.01); *H04B 2203/5412* (2013.01)

(56) References Cited

FOREIGN PATENT DOCUMENTS

| | | |
|---|---|---|
| KR | 20030050407 | 6/2003 |
| KR | 20130026103 | 3/2013 |
| KR | 101277650 | 6/2013 |
| KR | 101278125 | 6/2013 |

* cited by examiner

COMMUNICATION DEVICE USING POWERLINE AND LED LIGHTING SYSTEM USING THE DEVICE

BACKGROUND

The present invention relates to a communication device using powerlines which can transmit and receive control data and so on by using the powerlines, and an LED (Light Emitting Diode) lighting system using the communication device which can control the LED lighting.

Recently, the interest on an illumination device or an illumination system using an LED (Light Emitting Diode) has increased dramatically. An LED lighting device has an advantage that power consumption might be less and their life is semi-permanent compared to a fluorescent lamp, an incandescent lamp, and a halogen lamp which have been previously used.

Lighting devices are installed at present in most households or buildings. These lighting devices are driven by using mostly alternating current with high power. In contrast, an LED is generally constructed by a PN junction structure and driven by using direct current with low power. The present LED lighting device has been developed and supplied in the light of compatibility of the existing lighting device and also suggested a construction which is directly connected with the existing electric wiring being supplied alternating current and then can be used. For this, a rectifying member and a separate driving member are equipped with the LED lighting device. Also, to solve the above problem, an LED driver in which an LED is driven by using alternating current has been introduced. However, there was a disadvantage that since the LED driver is very high-priced, the price of the lighting device becomes high.

On the other hand, an LED lighting device has an advantage that a lighting control, which is called a dimming control, is very easy. An LED illumination device can not only implement various illumination environments but also reduce more power consumption through a dimming control. This dimming control is realized through a method for controlling the amount of power being provided to an LED or an LED module. As mentioned above, a driving member for driving an LED or an LED module is equipped with an LED module or an LED lighting device. The driving member exercises, for example, a dimming control by controlling duty control (PWM: Pulse Width Modulation control) of driving power being supplied to an LED or an LED module. The driving member exercises a dimming control according to control data being supplied from the outside. The supply of control data to the driving member is performed by a separate communication member. On this account, a member for transmitting and receiving control data by wire or wireless is required to the driving member.

Generally, to perform wireless communication, many high-priced components are required. This causes increases of the manufacturing cost, power consumption, and the maintenance fee of the LED lighting device. Also, to perform wire communication, since a separate communication line is required, an installation work of a lighting device become cumbersome, especially, when installing an LED lighting device by using a light wiring which had been installed previously, there exist many difficulties.

Korean Patent No. 10-1142106 (title of invention: CONSTANT LED CONVERTER CAPABLE OF GROUP DIMMING) discloses that a device for controlling dimming of an LED group through a method for changing the size of input voltage supplying to an LED lighting device is introduced. In this patent, the supply power being supplied to an LED or an LED module is set and changed into, for example, 220V, 210V, 200V, and 190V and so on, and at an LED side, a converter controls properly the amount of power being supplied to an LED according to the voltage of the supply power being supplied from the outside, thereby controlling dimming.

However, in the above patent, a control member and a converter, that is, between driving members, the communication does not exercise, since only the converter exercises the dimming control based on the voltage of the driving power being supplied from the outside, various driving controls, that is, various dimming controls are impossible, especially, the stability of operation to an LED lighting device cannot be secured.

Also, Korean Patent No. 10-0261512 (title of the invention: REMOTE CONTROL DEVICE USING BI-DIRECTIONAL POWER LINE COMMUNICATION AND A CONTROL METHOD THEREOF) and Korean Patent No. 10-0473526 (title of the invention: REMOTE CONTROL DEVICE USING POWER LINE COMMUNICATION) disclose a construction that a bi-directional communion is performed by power line, thereby capable of remote controlling a power device. However, these devices have problems that a construction is complicate and its manufacturing cost is high.

SUMMARY OF THE INVENTION

In consideration of the above-described problems of the prior art, it is an object of the present invention to provide a communication device using powerlines in which a bi-directional communication can be performed by using powerlines in a simple method and simple construction.

Another object of the present invention is to provide an LED lighting system by using the above communication device.

TECHNICAL SOLUTION

In order to accomplish the above objects, according to an aspect of the present invention, there is provided a communication device for performing communication using powerlines comprising:

a first control member coupled with the powerlines; and
a second control member installed to a load,
wherein the first control member and the second control member performs data transmission and reception by using the powerlines,
the first control member changes and sets the voltage effective value of power one period being supplied to the load through the powerlines according to the value of data transmitting to the second control member, and
the second control member changes and sets the current level corresponding to a first section of power one period being supplied to the load through the powerlines according to the value of data transmitting to the first control member.

Preferably, the first section includes 0.5 ms section just before the zero crossing of power current.

Further, preferably, the first section includes 0.5 ms section that the power current starts rising from the zero crossing point.

According to another aspect of the present invention, there is provided a communication device for performing communication using powerlines comprising:

a first control member coupled with the powerlines; and
a second control member installed to a load, wherein the first control member and the second control member performs data transmission and reception by using the powerlines, and the first control member changes and sets the voltage level corresponding to a first section of power one period being supplied to the load through the powerlines according to the value of data transmitting to the second control member.

Preferably, the second control member changes and sets the current level corresponding to a second section of power one period being supplied to the load through the powerlines according to the value of data transmitting to the first control member.

Further, preferably, the first section includes 0.5 ms section that the power voltage starts rising from the zero crossing point.

Further, preferably, the first section includes 0.5 ms section that the power current starts falling from the zero crossing point.

Further, preferably, the first section includes 0.5 ms section just before the zero crossing of power current.

Further, preferably, the first section includes 0.5 ms section after the zero crossing of power current.

According to another aspect of the present invention, there is provided a communication device for performing communication using powerlines comprising:

a control device coupled with the powerlines; and a load control device installed to a load, wherein the control device and the load control device performs data transmission and reception by using the powerlines, the control device comprises a first voltage detecting member coupled with the powerlines and for detecting change of power voltage, a voltage setting member coupled with the powerlines and for changing and setting the effective voltage of power voltage supplied to the load, and a first control member for controlling the operation of the voltage setting member, the first control member changes and sets the effective voltage of power voltage being supplied to the load by driving the voltage setting member according to the value of data transmitting to the load control member, and the load control device comprises a second voltage detecting member coupled with the powerlines and for detecting change of power voltage, and a second control member for receiving data being transmitted from the control device by discriminating the effective value of power voltage on the basis of the detecting voltage of the second voltage detecting member.

Preferably, the control device transmits 1 bit data per power one period.

Further, preferably, the first control member discriminates the zero crossing point of power voltage on the basis of detecting voltage by the first voltage detecting member, and changes and sets the effective voltage of power voltage by driving the voltage setting member at the zero crossing time of power voltage.

Further, preferably, the load control device comprises a power member for producing power for driving the load by using input power, the power member cuts off flow of power current being transmitted to the load through the powerlines during the first section of power one period, the load control member further comprises a pulse generating member for generating current pulse during the first section, the second control member drives the pulse generating member by corresponding to the data value being transmitted to the control device, and wherein the control device further comprises a current detecting member for detecting power current, and the first control member receives data from the load control device by detecting the current pulse during the first section.

Further, preferably, the first section includes 0.5 ms section just before the zero crossing of power current.

Further, preferably, the first section includes 0.5 ms section after the zero crossing of power current.

Further, preferably, the control device further comprises a communication member for performing communication with the outside.

According to another aspect of the present invention, there is provided a communication device for performing communication using powerlines comprising:

a control device coupled with the powerlines; and a load control device installed to a load, wherein the control device and the load control device performs data transmission and reception by using the powerlines, the control device comprises a first voltage detecting member coupled with the powerlines and for detecting change of power voltage, a voltage cutoff member coupled with the powerlines and for performing cutoff of power voltage supplied to the load, and a first control member for controlling the operation of the voltage cutoff member, the first control member drives selectively the voltage cutoff member according to the value of data transmitting to the load control member, and the load control device comprises a second voltage detecting member coupled with the powerlines and for detecting change of power voltage, and a second control member for receiving data being transmitted from the control device on the basis of the detecting voltage of the second voltage detecting member.

Preferably, the control device drives selectively the voltage cutoff member during the first section of one period of power voltage.

Further, preferably, the first section includes 0.5 ms section that the power voltage starts rising from the zero crossing point.

Further, preferably, the first section includes 0.5 ms section that the power current starts falling from the zero crossing point.

Further, preferably, the control device drives selectively the voltage cutoff member during the first section in which the power voltage starts rising from the zero crossing point and the second section in which the power current starts falling from the zero crossing point.

Further, preferably, the load control device comprises a power member for producing power for driving the load by using input power, the power member cuts off flow of power current being transmitted to the load through the powerlines during the third or fourth section of power one period, the load control member further comprises a pulse generating member for generating current pulse during the third or fourth section, the second control member drives the pulse generating member by corresponding to the data value being transmitted to the control device, and wherein the control device further comprises a current detecting member for detecting power current, and the first control member receives data from the load control device by detecting the current pulse during the third or fourth section.

Further, preferably, the third section includes 0.5 ms section just before the zero crossing of power current.

Further, preferably, the fourth section includes 0.5 ms section after the zero crossing of power current.

Further, preferably, the control device further comprises a communication member for performing communication with the outside.

According to another aspect of the present invention, there is provided an LED lighting system comprising:

one or more control devices coupled with commercial power source through powerlines;

one or more LED illumination devices coupled with control devices, respectively, through the powerlines; and a management device for performing communication with the control devices;

wherein the control devices and the LED lighting device perform data transmission and reception by using the powerlines, the data communication from the control devices to the LED lighting device is executed by broadcasting method, and the data communication from the LED lighting device to the control devices is executed by polling method.

Preferably, the LED lighting device comprises one or more group IDs, and the control devices transmit dimming data to the LED lighting device by using the group IDs.

Advantageous Effects

The communication device using a power line and an LED lighting system using the same according to the present invention having the above-described configuration has effects as follows. A control device and a load, that is, an LED lighting device can transmit and receive data by using powerlines. Accordingly, even in that case that an LED lighting device is installed by using the existing electric wiring, an additional wiring work will not be required. Also, according to the present invention, since a manager can integrally control a plurality of LED lighting devices installed at the inside of the building and so on by using a management device, the work of the manager has become very convenient.

DETAILED DESCRIPTION OF THE INVENTION

Hereinafter, embodiments according to the present invention will be described in detail with reference to the accompanying drawings. The embodiments are preferred embodiments of the present invention and do not limit the scopes of claims. This invention has been described in its presently contemplated best mode, and it is clear that it is susceptible to numerous modifications, modes and embodiments within the ability of those skilled in the art and without the exercise of the inventive faculty.

Figure 1:
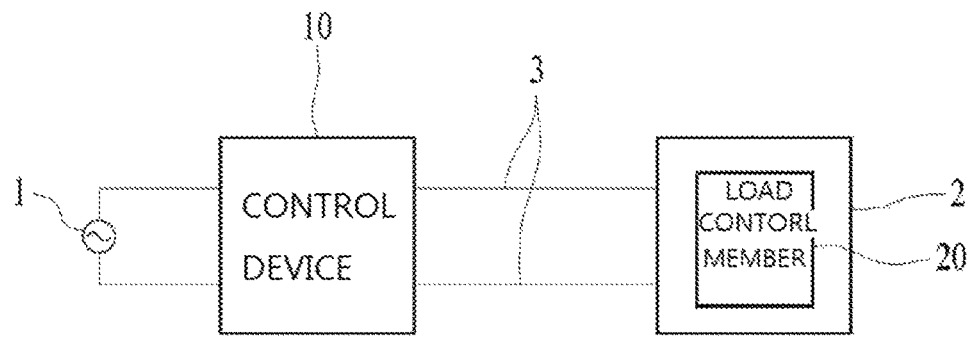
FIG. 1 is a basic construction view explaining a basic concept according to an embodiment of the present invention.

FIG. 1 is a basic construction view explaining a basic concept according to an embodiment of the present invention.

As shown in FIG. 1, a load 2 is electrically connected with commercial power source through power lines 3. A plurality of loads can be connected to the power lines 3 and in that case, loads 2 are connected with the power lines in series or in parallel. A control device 10 is equipped with a side of the commercial power source 1. A load control member 20 is equipped with the load 2 to control the operation of the load. The load control member 20 is connected with the control device 10 through the power lines 3.

The control device 10 can include a user interface for a manager or a wire or wireless communication member for performing communication with a separate management device. The control device 10 produces control data for controlling the operation of the load 2 and then transmit it to the load control member 20 through the powerlines 3. The load control member 20 receives control data transmitted from the powerlines 3, and then drives and controls the load 2.

Also, the load control member 20 produces the proper response data including acknowledge data and so on and transmit it to the control device 10 through the powerlines 3. An uplink for transmitting data did not be necessarily required and can be equipped selectively.

As a downlink data transmitting method for transmitting data from the control device 10 to the load control member 20, we can consider the two-kind of methods as follows:

1. According to whether the data transmitted to the load 2 is "0" or "1", the voltage maximum value or voltage effective value of one period of power is set differently (First method).

2. A constant section of one period of power being supplied to the load 2 is set a data section and the power voltage of the data section is selectively set to low level, that is, "0" level according to whether the data being transmitted to the load 2 is "0" or "1". (Second method).

Figure 2A:
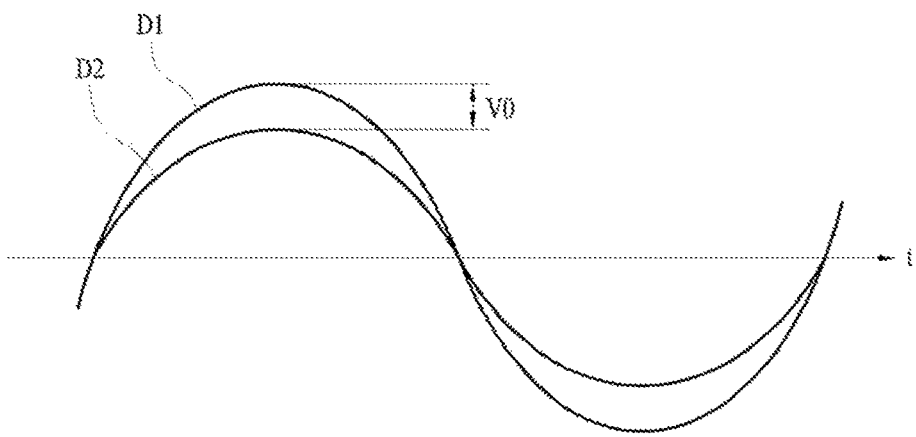
FIGS. 2 and 3 are views explaining a downlink data transmission method.
Figure 2B:
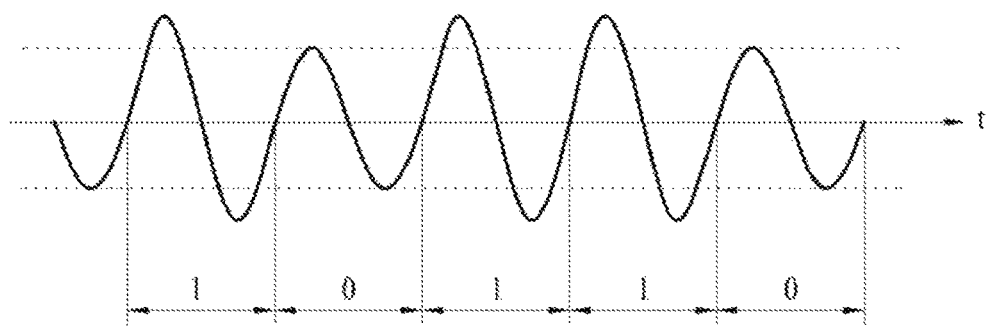

FIG. 2a shows a view illustrating a voltage waveform of power supplied to the load 2 according to the first method. FIG. 2b shows a first power voltage D1 and a second power voltage D2.

In the first power voltage D1 and the second power voltage D2, period and phase according to the time are identical, whereas their maximum values or voltage effective values are set differently. The maximum value of the first voltage D1 is set, for example, 220V, and the maximum value of the second power voltage D2, for example, 200V.

According this, the difference value V0 of the maximum values of the first and second power voltages D1 and D2 is set as 20V, that is, about 10% of the maximum value of the first power voltage D1. Of course, the maximum values of the first and second power voltages D1 and D2 are not limited to the specific value.

In consideration of the voltage effective value, since the first power voltage D1 has AC 220V and the second power voltage D2 has AC 200V, the voltage effective value of the first power voltage D1 is about 311V and the voltage effective value of the second power voltage D2 is about 283V.

In this method, as shown in FIG. 1, the control device 10 supplies, for example, the first power voltage D1 to the load 2 at the state that data are not transmitted, i.e., an idle state. In the state that data are transmitted, the control device supplies the second power voltage D2 with data "1" and the first power voltage D1 with data "0" to the load 2. Also, at the idle state, in case that the power voltage being supplied to the load 2 is set as the second power voltage D2, when transmitting data, for example, the first power voltage is set as data "1" and the second power voltage D2 as data "0".

FIG. 2b is a view illustrating waveform of power voltage being supplied from the control device 10 to the load 2, when the first power voltage D1 is data "1" and the second power voltage D2 is data "0", in case that the control data "10110" are transmitted from the control device 10 to the load 2.

Also, in the above method, 1 bit data are transmitted during one period of power and when plural kinds of the maximum values or voltage effective values of one period are set, plural data can be transmitted during one period of power.

Figure 3A:
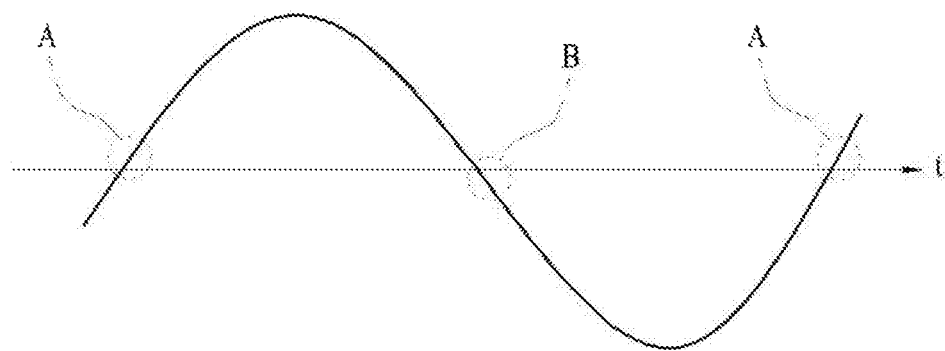

As described above, in the second method, that is, that a constant section of one period of power is set as a data section, a data section for transmitting data firstly is selected properly. The data section can be set arbitrarily and desirably, as shown in FIG. 3a, A section that the power voltage is rising from zero crossing point and B section that the power voltage is falling from zero crossing point are adopted.

Figure 3B:
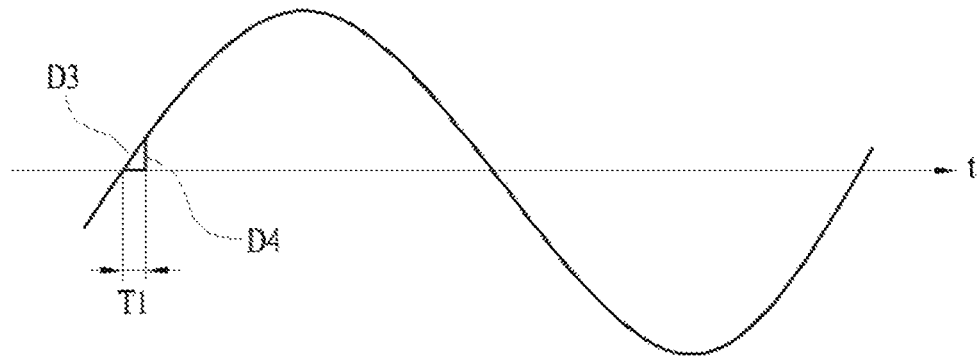

FIG. 3b is a view illustrating voltage waveform of power being supplied to the load 2, in case that 1 bit data, that is, data "0" or "1" are transmitted by using A section. In the FIG. 3b, the third power voltage D3 and the fourth power voltage D4 are illustrated. The third power voltage D3 is the same as the general power voltage. Regarding this, the period and phase according to time of the fourth power voltage D4 are the same as those of third power voltage D3, whereas a constant section that the power voltage is rising from zero crossing point at one period of power, that is, a data section T1 is set as a time section with the degree of 0.5 ms from zero crossing point desirably. The length of the data section T1 can be changed properly.

In the data section T1, the voltage level is selectively set as "0" level according to whether data being transmitted to the load 2 are "0" or "1". That is, the control device 10 of FIG. 1, supplies, for example, the third power voltage D3 to the load 2 at the idle state, that is, the state not being transmitted data, whereas at the state being transmitted data, that is, the fourth power voltage D4 as data "1" and the third power voltage D3 as data "0" are supplied to the load 2.

Figure 3C:
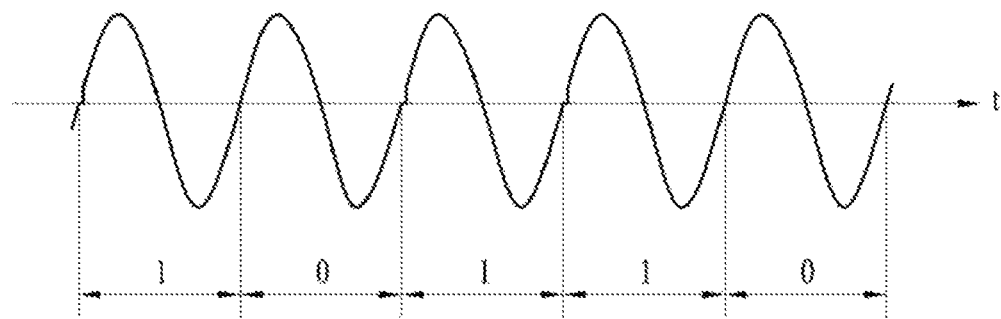

FIG. 3c, likewise FIG. 2b, is a view illustrating power voltage supplied from the control device 10 to load 2 when the control data "10110" are transmitted from the control device 10 to the load 2.

Figure 3D:
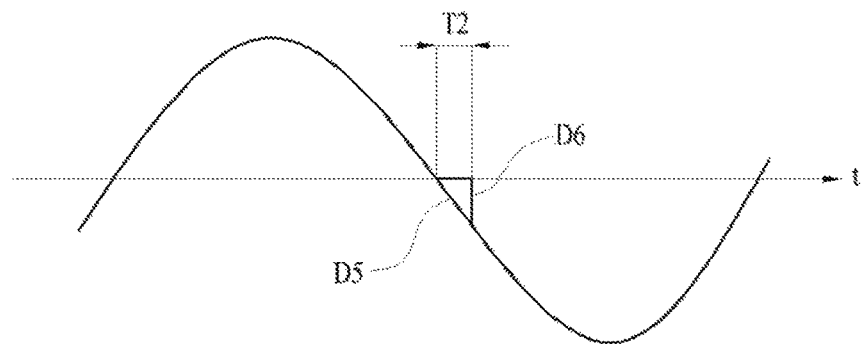

FIG. 3d is a view illustrating voltage waveform of power being supplied to the load 2, in case that 1 bit data, that is, data "0" or "1" are transmitted by using B section, that is, a section that the power voltage is falling from zero crossing point. FIG. 3d illustrates the fifth power voltage D5 and the sixth power voltage D6. The fifth power voltage D5 is the same as the general power voltage. Regarding this, the period and phase according to time of the sixth power voltage D6 are the same as those of fifth power voltage D5, whereas a constant section that the power voltage is falling from zero crossing point at one period of power, that is, a data section T2 is set as low level, for example, "0" level. Also, in this case, the data section T2 is set as a time section with the degree of 0.5 ms from zero crossing point desirably. The length of the data section T2 can be changed properly.

Also, in this example, tn the data section T2, the voltage level is selectively set as "0" level according to whether data being transmitted to the load 2 are "0" or "1". That is, the control device 10 of FIG. 1, supplies, for example, the fifth power voltage D5 to the load 2 at the idle state, that is, the state not being transmitted data, whereas at the state being transmitted data, that is, the sixth power voltage D6 as data "1" and the fifth power voltage D5 as data "0" are supplied to the load 2.

Figure 3E:
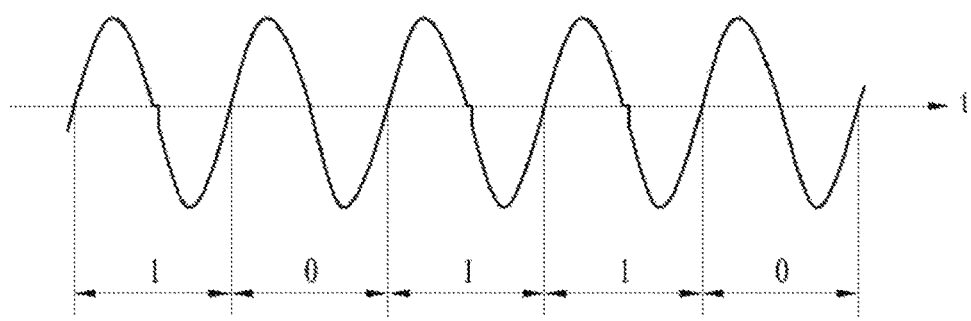

FIG. 3e, according to an embodiment of the present invention, is a view illustrating waveform of power voltage supplied from the control device 10 to load 2 when the control data "10110" are transmitted from the control device 10 to the load 2.

Also, in another embodiment of the present invention, data "1" and data "0" are transmitted respectively by using A section and B section of FIG. 3a together. For example, the control device 10 supplies normal power voltage to the load 2 at the idle state, that is, the state not being transmitted data, whereas at the state being transmitted data, when transmitting data "1", the power voltage in which A section is set as data "1" is transmitted to the load 2, and when transmitting data "0", the power voltage in which B section is set as data "0" to the load 2.

Figure 3F:
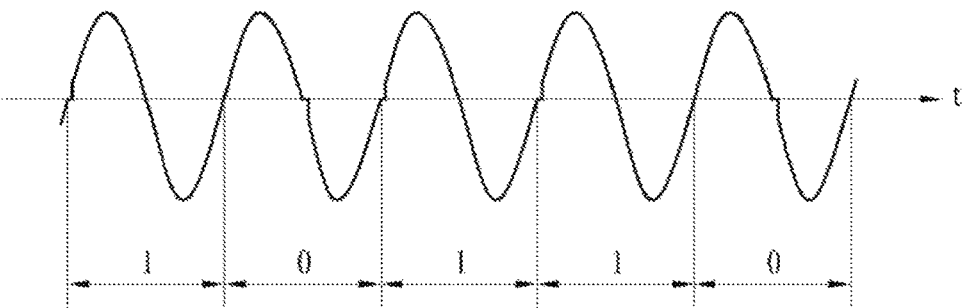

FIG. 3f, according to an embodiment of the present invention, is a view illustrating waveform of power voltage supplied from the control device 10 to load 2 when the control data "10110" are transmitted from the control device 10 to the load 2.

In this case, the following method also can be adopted: when transmitting data "1", B section is set as "0" level and when transmitting data "0", A section is set as "0" level.

Also, in the method of FIG. 3, as mentioned above, although a case that 1 bit data per one period of power voltage are transmitted is explained as an example, the following method can be implemented: total 2 bit data per one period of power voltage can be transmitted by transmitting one bit data to A section and B section, respectively.

In addition, an uplink data transmission method for transmitting data from a load control member 20 equipped to a load 2 side to the control device 10 will be described.

Referring to FIG. 1, the driving power for the load 2 is supplied from commercial power source 1 to the load 2 side. At this time, to be supplied driving current to the load 2, commercial power source 1 and the load 2 must be connected electrically. If the load 2 makes the power line open, the electrical combination between commercial line 1 and load 2 is disconnected and then driving current flowing from commercial line 1 to load 2 is cut off.

In the present invention, a load control member 20 transmits data to the control device 10 as a method for being cut off the flow of driving current between the control device and the load control member 20. At this time, the section for being cut off the driving current is determined beforehand between the control device 10 and the load control member 20. In an embodiment below, an uplink data section for transmitting data from the load control member 20 to the control device 10 is set as a specific section among one period of power voltage, preferably, for example, 0.5 ms section falling power voltage to zero crossing point.

Here, the reason why the uplink data section is set as the section falling power voltage to zero crossing point is to prevent downlink data section T2 and uplink data section T1 from superposing, when down link data transmission and uplink data transmission are running simultaneously at the above the second method for transmitting data from the control device 10 to the load control member 20. In a case that the control device 10 is set according to the first method and so transmit control data to the load control member 20, data sections T1 and T2 of FIG. 3 can be used as an uplink data section.

Also, in a case that a downlink data transmission and an uplink data transmission are set to be executed at other power voltages, data sections T1 and T2 of FIG. 3 can be used as an uplink data section.

In a method for transmitting data by using the uplink data section, firstly, likewise the downlink data transmission as described above, it can be considered that according to whether the data transmitting from the load control member 20 to the control device 10 are "0" or "1", the current value of the uplink data section is set selectively as low level, for example, "0" level.

Figure 4A:
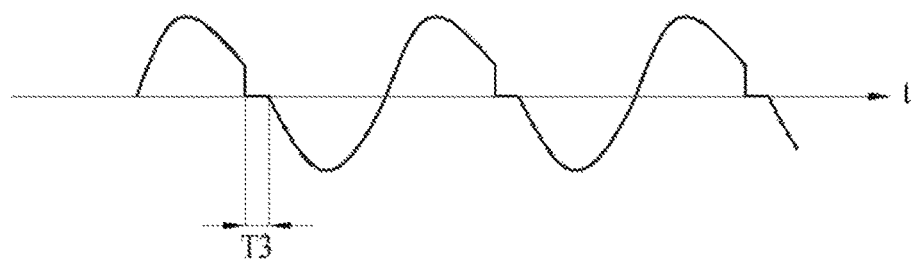
FIG. 4 is a view explaining an uplink data transmission method.
Figure 4B:
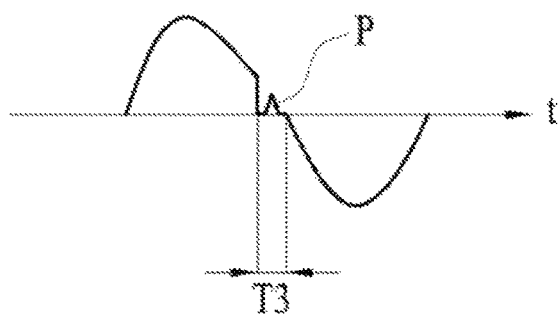

Also, as a preferred method, as shown in FIG. 4a, during the uplink data section T3, the current value of driving current being supplied to the load 2 is basically set as "0" level, the current pulse P is inserted into the uplink data section T3, as shown in FIG. 4b, according to whether data transmitted from the load control member 20 to the control device 10 are "0" or "1".

Figure 4C:
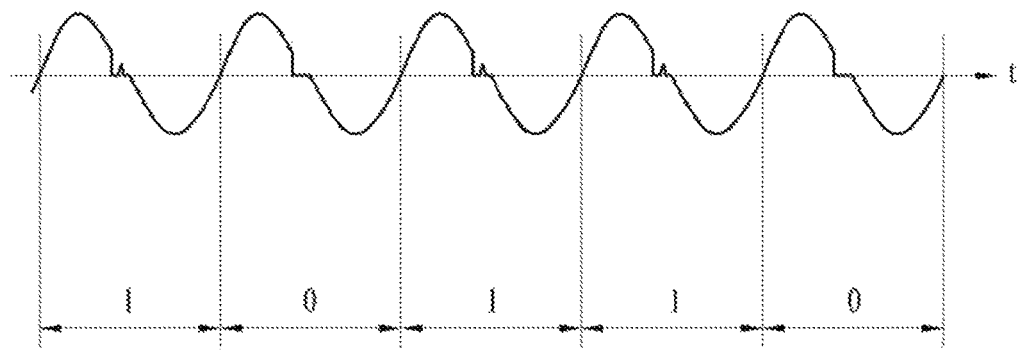

FIG. 4c, when a case that pulse P is inserted into the uplink data section T3 is defined as data "1", is a view illustrating driving current waveforms flowing from commercial power 1 to load 2 when the response data "10110" are transmitted from the load control member 20 to the load 2.

Figure 4D:
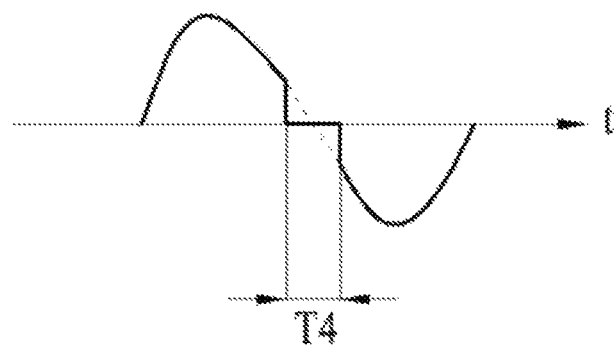

Also, in another embodiment of the present invention, as shown in FIG. 4d, the uplink data section T4 is set as total 1 ms by including 0.5 ms section falling power voltage from the first direction to zero crossing point and 0.5 ms section rising power voltage from the second direction to zero crossing point again. This is for the control device 10 to recognize stably data transmitted from the load control member 20.

Figure 4E:
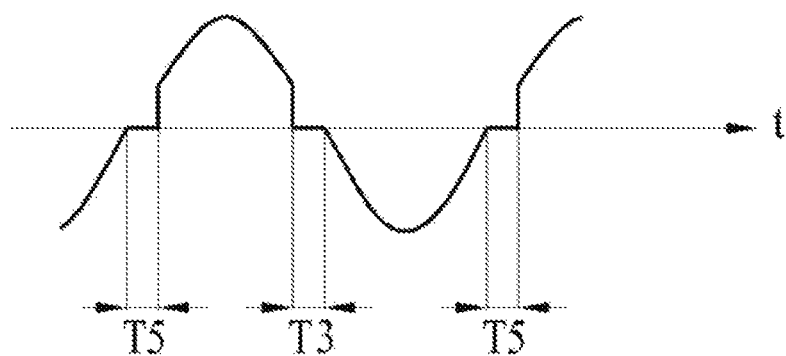

In the embodiments of FIGS. 4a to 4d, an uplink data section is set to a section falling power voltage from the first direction to zero crossing point. According this, an amount of data transmission is set as one bit to one period of power. In another embodiment of the present invention, the uplink data section, as shown in FIG. 4e, is set as two sections of T3 section falling power current from the first direction to zero crossing point and T5 section rising power current from the first direction to zero crossing point. In this embodiment, since data are transmitted by using two sections during one period of power current, an amount of data transmission is set as two bits to power one period.

In addition, a device for performing transmission and reception of data according to the data transmission and reception method will be described. Hereinafter, to explain in simple, a downlink data transmission is executed by the first method illustrated in FIG. 2 and the second method illustrated in FIGS. 3b and 3c, and an uplink data transmission is executed by a method illustrated in FIGS. 4b and 4c.

Figure 5:
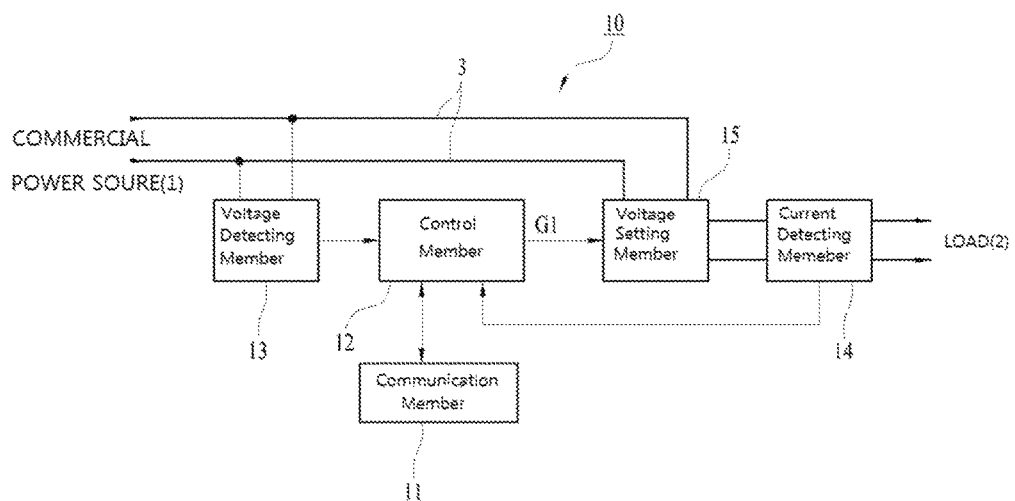
FIG. 5 is a block construction view illustrating the first construction example of a control device 10 of FIG. 1.

FIG. 5 is a block construction view illustrating a construction of a control device 10 according to the first embodiment of the present invention. As shown in FIG. 5, the construction of the control device 10 will be described: the voltage effective values of power one period to be supplied to the load 2 are set differently according to the first method illustrated in FIGS. 2a and 2b, that is, whether data transmitted to the load 2 are "0" or "1".

The control device 10 has selectively a communication member 11. A user interface for a manager or a wire or wireless communication member for performing communication with a separate management device can be adopted as the communication member 11. A control member 12 consists of, for example, a microprocessor. When a control commend is inputted from the communication member 11, on the basis of this, the control member 12 performs data communication with a load 2, more specifically, a load control member 20, thereby controlling driving of the load 2.

As shown in FIG. 5, a voltage detecting member 13, a current detecting member 14 and a voltage setting member 15 are connected with the powerlines 3. The voltage detecting member 13 detects power voltage supplied to the load 2 and then provides it to the control member 12. In the power voltage supplied to the load 2, for example, since its maximum value is 220V, the control member 12 cannot detect directly the change of power voltage. The voltage detecting member 13, which is not depicted specifically on a drawing, consists of a resistor divider circuit. According this, commercial power source 1 is divided into, for example, voltage of 5V below and then inputted to the control member 12. The control member 12 discriminates the zero crossing point, downlink data section and uplink data section of power voltage on the basis of the input voltage change from the voltage detecting member 13.

The current detecting member 14 is to receive uplink data transmitted from the load control member 20 to the control device 10. The current detecting member 14 consists of current transformer installed at the powerline 3, a bridge rectifier circuit, for example, for rectifying the output current of the current transformer, and a resistor divider circuit connected with an output end of the rectifying circuit. That is, the current detecting member 14 inputs voltage of a level corresponding to the current value supplied to the load 2 through the powerline 3. Since a specific construction is not be required as the current detecting member 14, its specific construction will not be illustrated.

The voltage setting member 15 is to transmit data to the load control member 20. The voltage setting member 15 changes power voltage being supplied to the load 2 according to a gate signal inputted from the control member 12.

Figure 6:
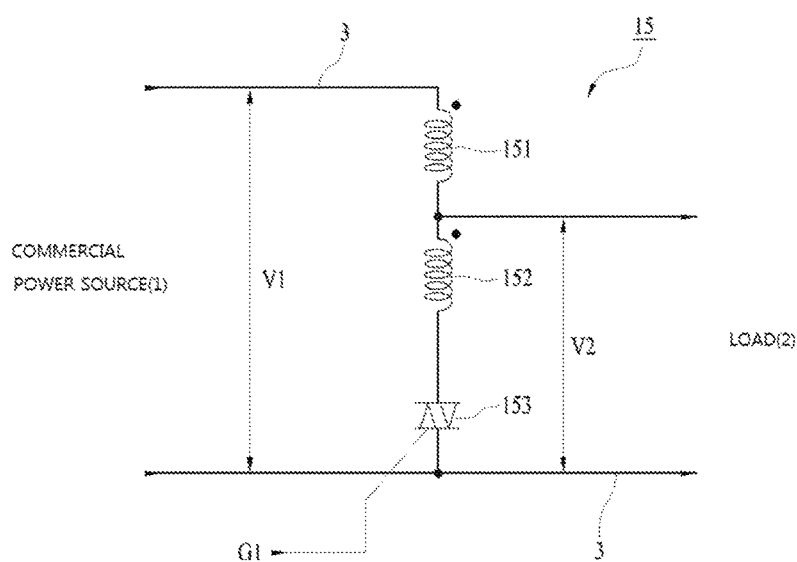
FIG. 6 is a circuit construction view illustrating specifically the construction of a voltage setting member 15 of FIG. 5.

FIG. 6 is a circuit diagram illustrating an example of a construction of the voltage setting member 15. As shown in FIG. 6, the voltage setting member 15 comprises a primary coil 151 connected with a side of the powerline 3 in series, a secondary coil 152 in which its end is connected with a side of powerline 3, and a switching member 153 for selectively connecting the other end of the secondary coil 152 with the other side of the powerline 3. Here, the switching member 53 comprises a triac preferably.

In the construction of FIG. 6, when the triac 153 is turned off, since the secondary coil 152 is set as open state to the powerline 3, V1 and V2 are set as the same value. On the other hand, when the triac 153 is turned on, the secondary coil 152 is electrically connected with the powerline 3. Accordingly, in this case, when the winding number of the primary coil 151 is N1 and the winding number of the secondary coil 152 is N2, V2 is determined as follows: V2=V1*N1/N2. In this embodiment, when the triac 153 is turned on by setting properly N2 and N1, for example, V2 is set to have low value about degree of 10% compared to V1.

In FIG. 5, when transmitting control data to the load 2 according to the command from the communication member 11, the control member 12 outputs a proper gate signal G1 according to the data value so that the triac 153 of the voltage setting member 15 is turned on/off. The change of on/off of the triac 153 is executed at the zero crossing moment of power voltage, preferably. And, the control member 12 detects input voltage from the current detecting member 14 in response to an uplink data section T3 of FIG. 4, and confirms whether the uplink data are received from the load 2. The control device 10 executes data transmission and reception to the load 2 through the above processes.

Figure 7:
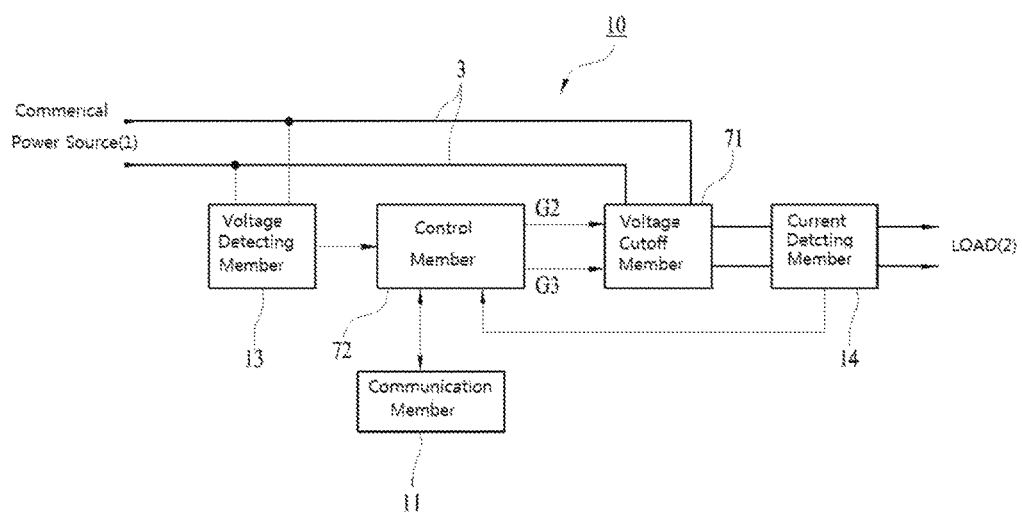
FIG. 7 is a block construction view illustrating the second construction example of the control device 10 of FIG. 1.

FIG. 7 is a block construction view illustrating the construction of the control device 10 according to the second embodiment of the present invention. As shown in FIG. 7, the construction of the control device 10 will be described the construction of the control device 10 of the second method illustrated in FIGS. 3a and 3b: a constant section of power one period to be supplied to the load 2 are set as a data section, and the power voltage of a data section is set selectively as a lower level, for example, "0" level according to whether data being transmitted to the load 2 are "0" or "1". Also, in FIG. 7, the same reference numbers are numbered to substantially same portions of the FIG. 5 and their explanation will be omitted.

The control device 10 of FIG. 7 comprises a power cutoff member 71 instead of the voltage setting member 15. The power cutoff member 71 is coupled with the powerlines 3 and cuts off power voltage supplied to the load 2 according to gate signals G2 and G3 applied from a control member 72. And, when transmitting data to the load 2, the control member 72 supplies gate signals G2 and G3 to the power cutoff member 71 in response to a downlink data section T1 illustrated in FIG. 3.

Figure 8:
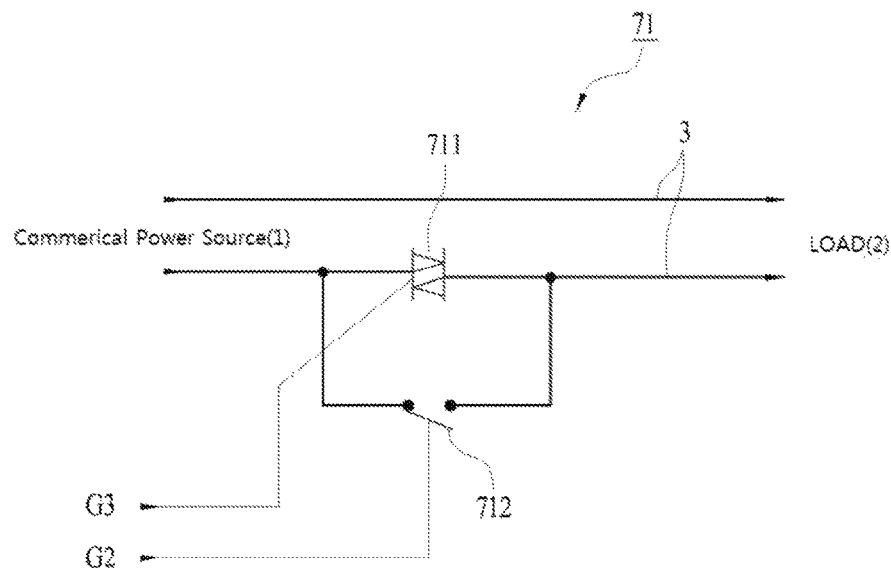
FIG. 8 is a circuit construction view illustrating specifically the construction of a power cutoff member 71 of FIG. 7.

FIG. 8 is a circuit construction view illustrating an example of the construction of the power cutoff member 71. As shown in FIG. 8, as a first switching member for performing cutoff of the powerlines 3, for example, a triac 711 is coupled in series to a side of the powerlines 3, and as a second switching member, for example, a relay switch 712 is coupled in parallel to a side of the powerlines 3. And, the triac 711 and the relay switch 712 are turned on/off by gate signals G3 and G2.

In the above-construction, in an idle state that data are not transmitted to the load 2, the control member 72 sets the relay switch 712 as ON state and the triac 711 as OFF state. Accordingly, in this case, driving power from commercial power source 1 is supplied to the load 2 through the relay switch 712.

On the other hand, in case of need of data transmission to the load 2, the control member 72 supplies gate signals G3 and G3 sequentially so that the triac 711 is set as ON state firstly and the relay switch 712 is set as OFF state. Accordingly, in this case, driving power from commercial power source 1 is supplied to the load 2 through the triac 711.

Also, the control member 72 transmits control data to the load 2 through the powerlines 3 by turning on/off the triac 711 in response to the downlink data section T1 of FIG. 3. When the data transmission is finished, the control member 72 turns the relay switch 712 on and turns the triac 711 off again, thereby making the power cutoff member 71 set as an idle state. Other operations, that is, data reception operation and so on from the load 2 are the same as those of FIG. 5 substantially.

Figure 9:
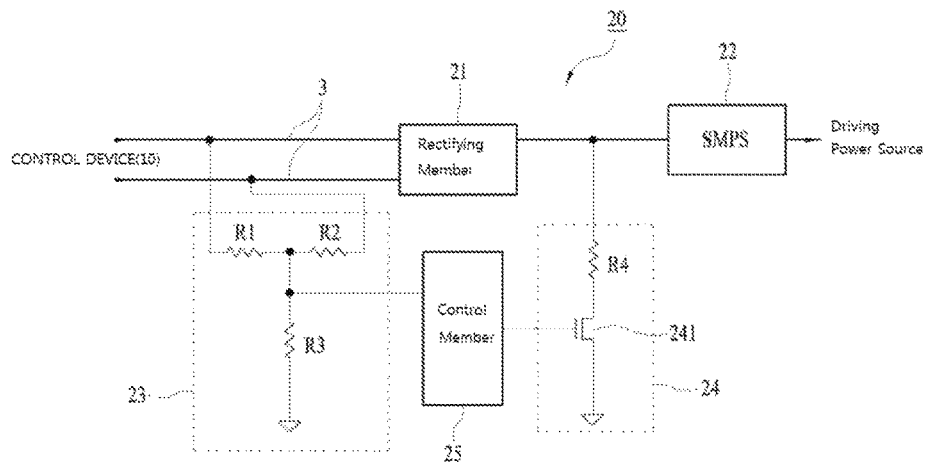
FIG. 9 is a construction view illustrating the construction of a load control member 20 of FIG. 1.

FIG. 9 is a construction view illustrating an example of the construction of the load control member 20 equipped to the load 2. In FIG. 9, a rectifying member 21 and an SMPS (Switching Mode Power Supply) 22 are equipped to the load 2 in general. Only, the SMPS 2 in this construction, as shown in FIG. 4a, cuts off current flowing to the primary coil (not shown) during the uplink data section T3, so that driving current flowing from commercial power source 1 to the load 2 is set as "0" level.

Also, in FIG. 9, a voltage detecting member 23 is equipped with the powerlines 3, preferably, the front end of the rectifying member 21. The voltage detecting member 23 comprises resistors R1 and R2 coupled between the powerlines 3 and a resistor R3 coupled between a coupling node of resistors R1 and R2 and a signal ground. The coupling node of resistors R1 and R2 is coupled with, for example, an analog input stage of a control member 25. The voltage detecting member 23, likewise the voltage detecting member 13 of FIG. 5, divides the commercial power source 1 inputted from the powerlines 3, for example, into the voltage of 5V below and then inputs it to the control member 25. Here, the voltage detecting member 23 is installed at the front end of the rectifying member 21 in order that the change of the detecting voltage by the voltage detecting member 23 according to the driving state of the load 2 is minimized.

Also, a pulse generating member 24 is coupled with the powerlines 3. The pulse generating member 24, for example, comprises a resistor R4 and a MOS transistor 241 coupled in series between the powerlines 3 and the signal ground.

The control member 25 comprises, for example, a microprocessor. The control member 25 discriminates the zero crossing point, downlink data section and uplink data section of commercial power source on the basis of the change of detecting voltage by the voltage detecting member 23. Especially, the control member 25 recognizes control data being transmitted from the control device 10 on the base of voltage being inputted from the voltage detecting member 24.

The control member 25 is driven by a program. The control member 25 will be programmed properly according to the construction of the control device 10. The control member 25, as shown in FIG. 5, when it is operated together with the control device 10, discriminates whether the power voltage being inputted from the powerlines 3 is the first power voltage D1 or the second power voltage D2 of FIG. 2a. In this case, the control member 25 discriminates the power voltage through a method of detecting the maximum value of one period of the power voltage or a method of calculating the effective vale of one period of the power voltage. As described above, when the first power voltage D1 is alternating current of 220V and the second power voltage D2 is alternating current of 200V, the effective value of the first power voltage D1 is about 311V and the effective value of the second power voltage D2 is about 283V.

Also, the control member 25, as shown in FIG. 7, when it is operated together with the control device 10, discriminates whether the power voltage being inputted from the powerlines 3 is the third power voltage D3 or the fourth power voltage D4 of FIG. 3a. In this case, the control member 25 performs sampling of the input voltage from the voltage detecting member 23, for example, by 100 microsecond (us) unit during the downlink data section T1 and discriminates whether the power voltage is the third power voltage D3 or the fourth power voltage D4.

Also, when transmitting data to the control device 10, the control member 25 turns on the MOS transistor 241 of the pulse generating member 24 at the uplink data section T3 as shown in FIG. 4, for example, for 0.2 ms, thereby generating current pulse P. And, this current pulse P, as described in FIGS. 5 and 7, is detected by the current detecting member 14 and then inputted to the control member 12 in the control device 10.

Figure 10:
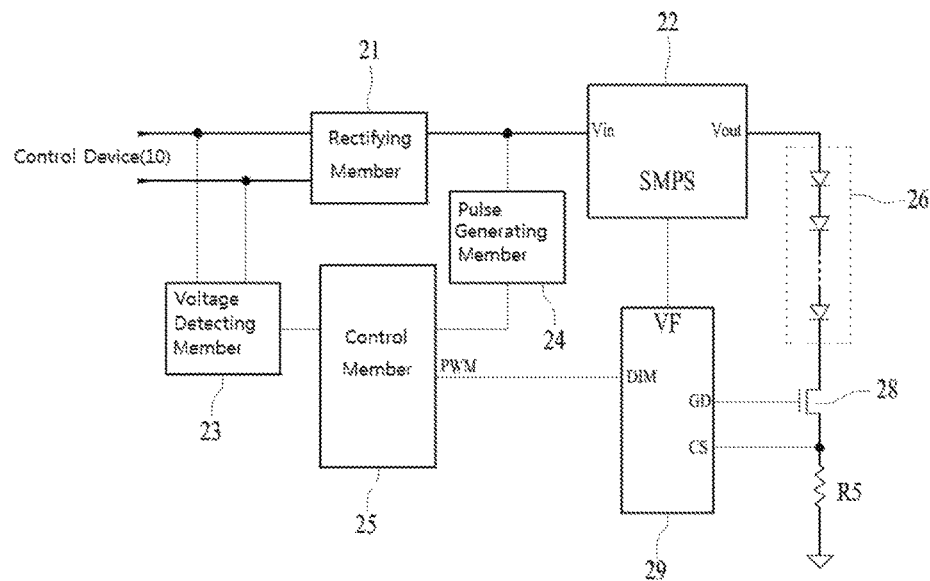
FIG. 10 is a construction view illustrating the construction example of an LED illumination device according to the present invention.

FIG. 10 is a construction view illustrating an example of the construction in which the load control member 20 as shown in FIG. 9 is applied to an LED illumination device. Also, in FIG. 10, the same reference numerals are used to the same portions substantially of FIG. 9 and so the detailed description about them will be omitted.

In FIG. 10, an end of an LED module 26 is coupled with a voltage output stage Vout of an SMPS 22 and the other end of the LED module 26 is coupled with a signal ground through a transistor 28 for performing cutoff of driving current flowing through the LED module 26 and a resistor R5 for detecting driving current flowing through the LED module 26.

A reference number 29 in the FIG. 10 is an LED driver for driving the LED module 26. A GD terminal of the LED driver 29 is coupled with a gate of the transistor 28 and the CS stage of the LED driver 29 is coupled with the connection node of the transistor 28 and the resistor R5.

When control data for performing the dimming control of the LED illumination device are inputted from the control device 10, a control member 25 receives the control data through a voltage detecting member 23 and thereafter produces a pulse width modulation (PWM) signal for performing dimming control. And, the PWM signal is provided to the LED driver 29. The LED driver 29 changes the PWM signal inputted through the dimming control stage DIM by digital/analog conversion and then produces the reference voltage corresponding to the PWM signal. And, the LED driver 29 turns on/off the transistor 28 in order that the voltage inputted through CS stage has the same value as the reference voltage, thereby properly controlling the driving current flowing through the LED module 26. Also, the LED driver 29 sets properly VF (Voltage Feedback) voltage being supplied to the SMPS 22, thereby controlling output of the SMPS 22 in order to be fit for the present dimming level.

Also, the control member 25 drives the pulse generating member 24 and transmits a reception response signal and so on to the control device 10.

Figure 11:
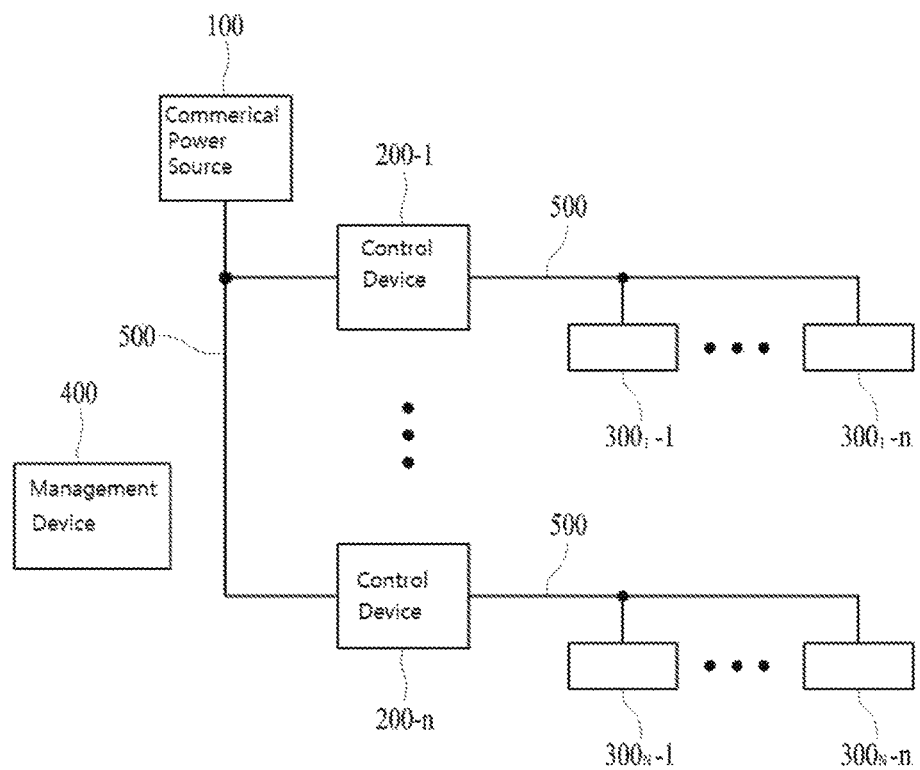
FIG. 11 is a block construction view illustrating the system construction of an LED illumination device according to the present invention.

FIG. 11 is a block construction view illustrating an LED illumination system according to the present invention. As shown in FIG. 11, a plurality of control devices 200-1 to 200-$n$ are electrically connected to commercial power source 100 through powerlines 500. And, a plurality of LED illumination devices $300_1$-1 to $300_1$-$n$ and $300_N$-1 to $300_N$-$n$ are coupled with the control devices 200-1 to 200-$n$ through powerlines 500.

The control device 200 has the same construction substantially as the control device 10 as shown in FIG. 5 or 7. Also, the LED illumination device 300 has the same construction substantially as the construction as shown in FIG. 10.

A management device 400 is for a manager. The management device 400 performs data communication with the control device 200. A manager controls entirely driving of the illumination device 300 through the management device 400.

The LED illumination device 300 has an inherent ID and a group ID. Plural group IDs can exist. The dimming control of the LED illumination device 300 is performed by the group ID. In case that the group IDs are provided to the LED illumination device 300, various illumination effects can be implemented.

When a manager executes dimming control through the management device 400, the control command corresponding to that is transmitted to the control device 200 and then the control device 200 produces control data corresponding to the control command and then transmits the control data through the powerlines 500. The transmission of the control data is performed by the broadcasting method and in case of need, individual or group ID for defining the forwarding address of the corresponding data is added.

Figure 12:
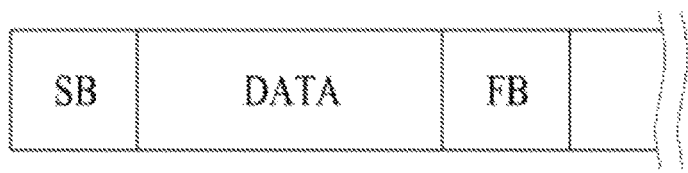
FIG. 12 is a view illustrating an example of a data format being transmitted and received between a control device 20 and an LED lighting device 300 in FIG. 11.

FIG. 12 shows an example of the format construction of data being transmitted and received between the control device 200 and the LED illumination device 300. As shown in FIG. 12, the transmission and reception data include, for example, one bit as start bit and 4 bits as data bit and after this, has the type in which frame bit with one bit and data bit with 4 bits are repeated.

The LED illumination device 300 transmits response data through the powerlines 500 in case that a response is required to the control device 100. As described above, the response data has the type that cuts off the power voltage flowing from the control device 200 to the LED illumination device 300. Accordingly, when plural LED illumination devices 300 transmit response data simultaneously, the collision of data occurred. For this reason, the uplink data transmission from the LED illumination device 300 to the control device 200 is executed by falling type.

And the control device 100 finishes the process corresponding to the control command from the management device 400 when all response data from the LED illumination device 300 in which control data are transmitted are received. Also, in case of need, the control device 200 transmits response data for reporting completion of the control command process to the management device 400.

The above-mentioned LED illumination system can construct an illumination system only by combining the control device 200 and the LED illumination device 300 with the powerlines 500. Accordingly, the LED illumination system can be easily implemented by using the existing illumination wiring. Also, in the above system, since a user can perform very stably the dimming control and so on relating to the entire LED illumination device 300 by using the management device 400, thereby enhancing the convenience of the manager drastically.

This invention has been described in its presently contemplated best mode, and it is clear that it is susceptible to numerous modifications, modes and embodiments within the ability of those skilled in the art and without the exercise of the inventive faculty. Accordingly, the scope of this invention is defined by the scope of the following claims.

The invention claimed is:

1. A communication device for performing communication using powerlines comprising:
   a control device coupled with the powerlines; and a load control device installed to a load, wherein the control device and the load control device performs data transmission and reception by using the powerlines, the control device comprises a first voltage detecting member coupled with the powerlines and for detecting change of power voltage, a voltage cutoff member coupled with the powerlines and for performing cutoff of power voltage supplied to the load, and a first control member for controlling the operation of the voltage cutoff member, the first control member drives selectively the voltage cutoff member according to the value of data transmitting to the load control device, and the load control device comprises a second voltage detecting member coupled with the powerlines and for detecting change of power voltage, and a second control member for receiving data being transmitted from the first control member on the basis of the detecting voltage of the second voltage detecting member, wherein the load control device comprises a power member for producing power for driving the load by using input power, the power member cuts off flow of power current being transmitted to the load through the powerlines during a first section of power one period, the load control member further comprises a pulse generating member for generating current pulse during the first section of one period of power current, the second control member drives the pulse generating member by corresponding to the data value being transmitted to the control device, and wherein the control device further comprises a current detecting member for detecting power current, and the first control member receives data from the load control device by detecting the current pulse during the third or fourth section.

2. The communication device using powerlines according to claim 1, wherein the control device drives selectively the voltage cutoff member during the first section of one period of power current.

3. The communication device using powerlines according to claim 2, wherein the first section includes 0.5 ms section that the power voltage starts rising from the zero crossing point.

4. The communication device using powerlines according to claim 2, wherein the first section includes 0.5 ms section that the power current starts falling from the zero crossing point.

5. The communication device using powerlines according to claim 1, wherein the control device drives selectively the voltage cutoff member during the first section in which the power voltage starts rising from the zero crossing point and the second section in which the power voltage starts falling from the zero crossing point.

6. The communication device using powerlines according to claim 1, wherein the third section includes 0.5 ms section just before the zero crossing of power current.

7. The communication device using powerlines according to claim 1, wherein the fourth section includes 0.5 ms section after the zero crossing of power current.

8. The communication device using powerlines according to claim 1, wherein the control device further comprises a communication member for performing communication with a separate management device.

* * * * *